United States Patent [19]
Dubois et al.

[11] 3,834,825
[45] Sept. 10, 1974

[54] CHAIN ANCHORING MEANS FOR A BICYCLE LOCK OR THE LIKE

[75] Inventors: Normand A. Dubois, 39 Samoset Ave., Providence, R.I.; Gary R. Skeen, Warwick, R.I.

[73] Assignee: said Dubois, by said Skeen

[22] Filed: Mar. 13, 1973

[21] Appl. No.: 340,751

[52] U.S. Cl............... 403/378, 403/213, 211/4, 59/93, 70/58, 70/234
[51] Int. Cl............................................ F16g 15/00
[58] Field of Search ........ 24/116 R, 115 K, 201 SL, 24/201 LP, 230 LP; 248/339, 341, 342, 343, 361 A; 70/18, 58, 234; 292/135, 264; 59/85, 93, 86; 152/233, 235, 238; 105/368 T; 280/179 A; 403/209, 213, 252, 254, 255, 378

[56] References Cited
UNITED STATES PATENTS

| | | | |
|---|---|---|---|
| 1,263,086 | 4/1918 | McLaughlin........................ | 152/238 |
| 1,281,620 | 10/1918 | McLaughlin et al................ | 152/235 |
| 1,391,694 | 9/1921 | Roof.................................. | 152/235 |

*Primary Examiner*—Jordan Franklin
*Assistant Examiner*—Conrad L. Berman
*Attorney, Agent, or Firm*—Salter & Michaelson

[57] ABSTRACT

A link chain secured to a first base member. A second base member is provided, the two members defining an opening through which a bar, such as that of a bicycle frame, extends. When the members are clamped to the bar, the chain is locked thereto. The chain can then be used to lock the bicycle wheel or lock the frame to a stanchion. The chain is anchored to the base member by providing the latter with a central oblong opening therethrough adapted to receive the end link of the chain. On its rear side, the member is provided with a recess into which the end link extends. A second oblong recess extends in from the first recess at right angles to the chain opening. A steel pin can be loosely positioned in the second oblong recess. The end link is passed inwardly through the oblong opening as far as it will go and then the steel pin is passed through the link and dropped into the oblong recess. The base members are then secured to each other with the bar clamped therebetween, in which position the bar prevents the end link from moving inwardly and the steel pin prevents outward movement thereof. In another form, the first base member is adapted to be mounted to a wall surface whereby the second base member is no longer necessary, although the structure and operation of the first base member remains basically the same. In this second form, the object is to attach one end of a chain securely to a wall surface.

8 Claims, 5 Drawing Figures

PATENTED SEP 10 1974　　　　　　　　　　　3,834,825
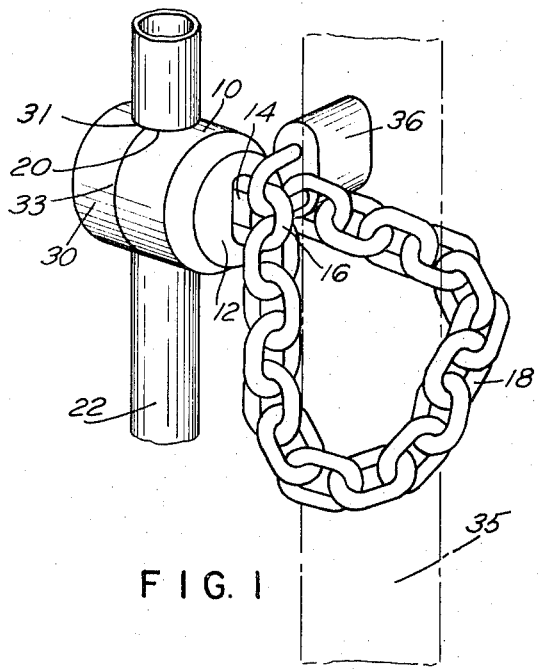
FIG. 1
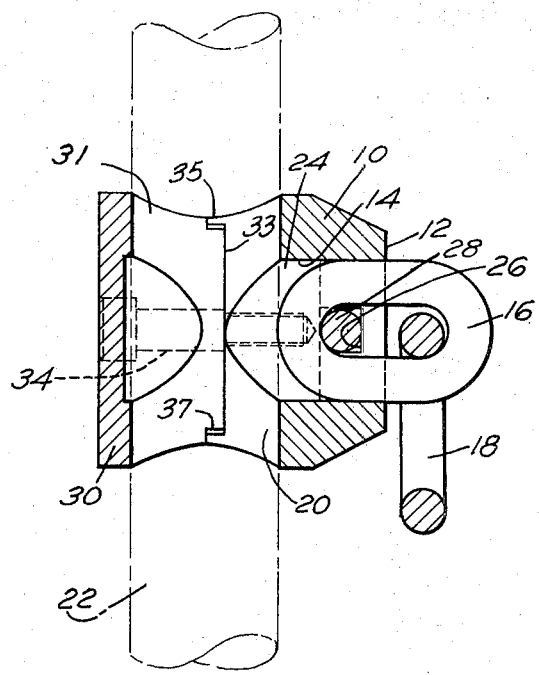
FIG. 2
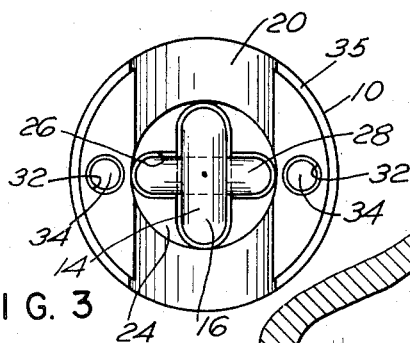
FIG. 3
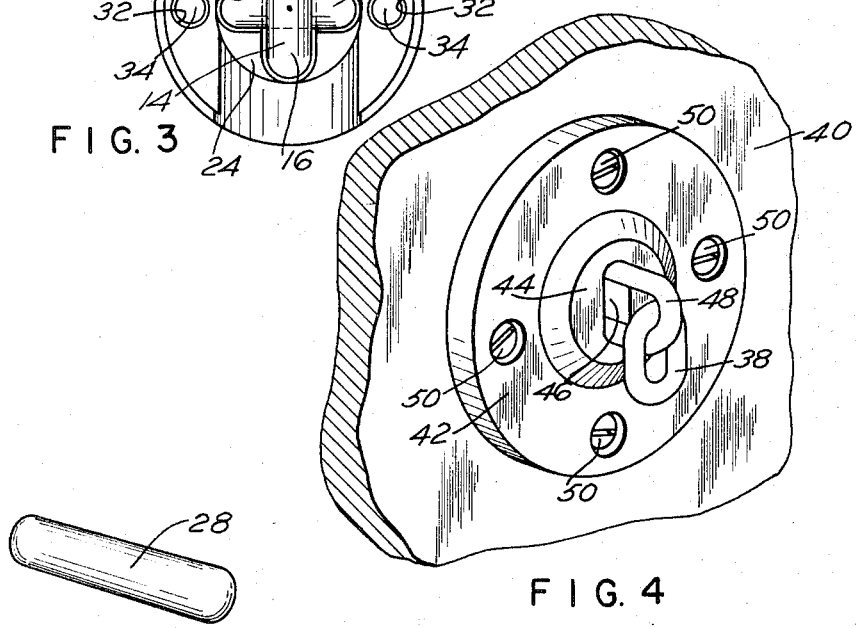
FIG. 5
FIG. 4

3,834,825

CHAIN ANCHORING MEANS FOR A BICYCLE LOCK OR THE LIKE

BACKGROUND AND SUMMARY OF THE INVENTION

The present invention relates generally to simplified and yet highly effective means for securely attaching one end of a link chain to a base member. A prime application of this invention is in connection with the locking of bicycles, and while the invention is hereafter described in connection with such use, it is clearly not limited thereto, but rather the described use is purely illustrative.

To prevent the theft of a bicycle, various means have been used to either lock the wheels against rotation or lock the frame of the bicycle to a stanchion or other fixed member. To this end, a heavy link chain is usually wrapped around a wheel or around the frame and to a stanchion, and a conventional padlock is used to lock the chain in place. No permanent connection is made to the bicycle with the result that the chain is often mislaid or lost.

The present invention is designed to provide a means for permanently locking a chain to a bicycle frame so that the bicycle can be locked against theft any time that it is left unattended regardless of the location. Furthermore, the present invention lends itself to an alternative form for locking a chain to a wall surface and then to the bicycle. In carrying out the first form of our invention, a link chain is connected to a base member. An auxiliary base member complements the base member to embrace a bicycle frame bar and be permanently attached thereto. The chain is also permanently attached to the base member. More specifically, the base member is provided with a central oblong opening therethrough, and at its rear side, the base member is provided with a recess into which the end link of the chain extends. From this recess an oblong recess extends into the member at right angles to the oblong opening. A steel pin may be loosely mounted in the oblong recess. Now the end link of the chain is passed through the oblong opening and the steel pin is passed through the end link and dropped into the oblong recess. When the member is fastened to the bicycle frame bar, neither the steel pin nor the end link can be moved, effectively locking the end link to the base member. The chain can then be passed either through the wheel or around a stanchion and padlocked in place to lock the bicycle. In another form, the auxiliary member is replaced by a wall. The base member is flat to fit against a wall surface for mounting thereon. The member is also provided with the slot and recesses as in the first form.

Other objects, features and advantages of the invention shall become apparent as the description thereof proceeds when considered in connection with the accompanying illustrative drawings.

DESCRIPTION OF THE DRAWING

In the drawings which illustrate the best mode presently contemplated for carrying out the present invention:

FIG. 1 is a perspective view of chain anchoring means of the present invention locking a bicycle frame to a stanchion;

FIG. 2 is a longitudinal section of the lock shown in FIG. 1;

FIG. 3 is a rear view of the base member;

FIG. 4 is a perspective view of another form of the invention; and

FIG. 5 is a perspective view of the steel pin used in my invention.

DESCRIPTION OF THE INVENTION

Referring more in detail to the drawings, the device shown in FIGS. 1, 2 and 3 comprises a base member 10 of cylindrical shape. The base member may be a metal casting for ready and easy manufacture. The base member 10 is provided with a flat front face 12 and a central oblong opening 14 extending therethrough. The opening 14 is just large enough to loosely receive the end link 16 of a heavy link chain 18.

Now, as can be seen in FIGS. 2 and 3, the rear of the base member 10 is provided with an arcuate portion 20 for mounting on the bar of a bicycle frame, the portion 20 surrounding approximately half the circumference of the bar 22. Extending into the rear of the base member 10 is a recess 24 having a depth approximately equivalent to the thickness of the metal in the end link 16. This allows the end link to be accommodated in this area when the member 10 is mounted on the bicycle frame bar 22 as shown in FIG. 2.

Extending inwardly from the recess 24, is a recess 26. The recess 26 is oblong and positioned at right angles to the central oblong opening 14, FIG. 3. A rigid pin 28, of steel or any other structurally strong material, fits loosely into the recess 26. When the end link 16 is passed through the oblong opening 14 and into the recess 24, it moves inwardly sufficiently so that the rigid pin 28 can be passed through the link 16 and dropped into the recess 26. This locks the end link against withdrawal and locks the chain 18 to the base member 10, when the latter has been secured to auxiliary base member 30, as now to be described.

To lock the base member 10 to the bicycle bar 22, the auxiliary base member 30 is provided with arcuate portion 31 which surrounds the other half of the circumference of the bar 22 so that member 30 abuts the edge of the base member 10, as at 33, FIGS. 1 and 2. Preferably, member 10 is provided with a peripheral flange 35 which interengages with peripheral shoulder 37 on member 30 to insure proper abutting alignment of the members. The members 10 and 30 are provided with conventional aligned bolt openings 32 and can be locked around the frame bar 22 by the bolts 34 which are preferably of the non-removable type. When the members 10 and 30 are clamped around bar 22, the latter prevents the end link from moving inwardly even though there is some slack between the next-to-the-end link and surface 12, as shown in FIG. 2. This insures that the inserted part of end link 16 remains in recess 24 which in turn maintains pin 28 in recess 26 so that the pin cannot accidentally become dislodged.

With the base member 10 locked to the bicycle bar 22 as shown and described, the heavy link chain 18 is now locked to the bicycle. It can be passed through a wheel to render it immobile, or it can be passed around a stanchion 35 as in FIG. 1 and locked with a padlock 36.

In the form shown in FIG. 4, the device is used to mount the heavy link chain 38 on a wall surface 40. In this form, the auxiliary base is unnecessary. The base member 42 is provided with a central hub portion 44 having an oblong opening 46 through the member. The opening 46 receives the end link 48 of the chain 38. The construction for locking the chain to the base member 42 is the same as in FIG. 2, i.e., the base member 42 is provided with the same recesses and steel pin at the rear. However, when the member 42 is mounted on the wall 40, as by non-removable bolts 50, the wall holds the parts together at the rear, dispensing with the need for an auxiliary base member. More specifically, whereas in the first form of my invention the bar 22 prevents the end link from moving inwardly sufficiently to accidentally permit pin 28 to become dislodged from its recess, in the alternative form this is accomplished by wall 40. Of course, in both forms, the pin 28 prevents withdrawal of the chain. The chain 38 in FIG. 4 is firmly locked to the fixed wall surface 40 and can be used to surround and lock a bicycle frame bar. If desired, both forms may be used simultaneously. The form shown in FIGS. 1, 2 and 3 may be used to lock the bicycle wheel and at the same time the form shown in FIG. 4 may be used to lock the bicycle frame to a wall or other fixed point.

Both forms are comparatively simple in construction and easy and economical to manufacture and assemble. The base members 10, 30 and 42 may all be cast. The insertion and locking of the chain is very easy.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A locking device in combination with a link chain comprising a base member having an oblong aperture therethrough, an oblong first recess in the rear of said base member intersecting and communicating with said aperture at substantially right angles thereto, the end link of said chain extending through said aperture, and a rigid pin loosely positioned in said recess and extending through said end link, whereby the end link will be locked to said base member when said base member is mounted on a support that prevents said end link from moving inwardly sufficiently to permit said pin to become dislodged from said recess, said pin and oblong first recess being inaccessible when the device is mounted on a support.

2. A device as in claim 1, wherein the rear of said base member is provided with a second recess for receiving the end link of the chain, the minimum depth of said recess being approximately equal to the material thickness of said chain.

3. A device as in claim 1, wherein the rear of said base member is provided with an arcuate portion adapted to fit around half the perimeter of a cylindrical bar.

4. A device as in claim 2, wherein the rear of said base member is provided with an arcuate portion adapted to fit around half the perimeter of a cylindrical bar.

5. A device as in claim 3, wherein an auxiliary base member is provided to permit clamping of a cylindrical bar between said auxiliary and base members, and means securely locking said members to each other.

6. A device as in claim 4, wherein an auxiliary base member is provided with an arcuate portion adapted to fit around half the perimeter of a cylindrical bar, said base member and said auxiliary base member adapted to fit around the bar in abutting relation, and non-removable bolts locking said members to each other in clamping relation for encircling the bar.

7. A device as in claim 1, wherein said base member is provided with a flat rear portion for mounting against a wall surface.

8. A device as in claim 2, wherein said base member is provided with a flat rear portion for mounting against a wall surface.

* * * * *